(12) United States Patent
Quan et al.

(10) Patent No.: US 9,686,764 B2
(45) Date of Patent: Jun. 20, 2017

(54) POSITIONING METHOD, DEVICE AND SYSTEM IN MULTI-CARRIER SYSTEM

(75) Inventors: Haiyang Quan, Beijing (CN); Wei Bao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 205 days.

(21) Appl. No.: 14/239,780

(22) PCT Filed: Jul. 30, 2012

(86) PCT No.: PCT/CN2012/079327
§ 371 (c)(1),
(2), (4) Date: Jun. 4, 2014

(87) PCT Pub. No.: WO2013/026346
PCT Pub. Date: Feb. 28, 2013

(65) Prior Publication Data
US 2014/0308974 A1   Oct. 16, 2014

(30) Foreign Application Priority Data

Aug. 19, 2011  (CN) .......................... 2011 1 0240162

(51) Int. Cl.
*H04W 24/00* (2009.01)
*H04W 64/00* (2009.01)

(52) U.S. Cl.
CPC .................................. *H04W 64/00* (2013.01)

(58) Field of Classification Search
CPC ......... H04W 4/22; H04W 4/02; H04W 48/04; H04W 65/00; H04L 29/08108; G01S 19/51
(Continued)

(56) References Cited

U.S. PATENT DOCUMENTS 5,970,414 A * 10/1999 Bi ........................ G01S 5/0036
455/456.3
5,991,620 A * 11/1999 Kingdon ................. H04W 4/16
455/432.3
(Continued)

FOREIGN PATENT DOCUMENTS

AL   102307385 A   1/2012
CN   101730222 A   6/2010
(Continued)

OTHER PUBLICATIONS

PCT International Search Report for PCT Counterpart Application No. PCT/CN2012/079327 with full English translation, 4 pgs. (Nov. 8, 2012).
(Continued)

*Primary Examiner* — Steve D Agosta
(74) *Attorney, Agent, or Firm* — Blakely, Sokoloff, Taylor & Zafman LLP (57) ABSTRACT

Disclosed are a positioning method, device and system in a multi-carrier system, relating to communications technology. When positioning in a multi-carrier system, the embodiments of the present invention respectively perform positioning measurements under a plurality of carriers and position user equipment according to the measurement results of the respectively performed positioning measurements under the plurality of carriers. Since the number of parameters for reference is increased when positioning, the positioning precision is improved.

7 Claims, 5 Drawing Sheets

(58) Field of Classification Search
USPC ............... 455/414.1, 456.1–457, 404.1; 342/357.34, 457
See application file for complete search history.

(56) References Cited

U.S. PATENT DOCUMENTS

| | | | | |
|---|---|---|---|---|
| 6,097,959 | A * | 8/2000 | Yost | G01S 5/14 455/456.2 |
| 6,134,447 | A * | 10/2000 | Havinis | H04W 64/00 455/433 |
| 6,243,588 | B1 * | 6/2001 | Koorapaty | G01S 5/14 342/457 |
| 2004/0063439 | A1 * | 4/2004 | Glazko | H04W 64/00 455/455 |
| 2007/0042798 | A1 * | 2/2007 | Chen | H04W 52/50 455/522 |
| 2008/0291086 | A1 * | 11/2008 | Walley | G01S 5/0263 342/367 |
| 2009/0286552 | A1 | 11/2009 | Wu | |
| 2010/0265968 | A1 * | 10/2010 | Baldemair | H04L 27/2695 370/503 |
| 2012/0083278 | A1 * | 4/2012 | Kazmi | H04W 64/00 455/440 |
| 2012/0134288 | A1 | 5/2012 | Fang et al. | |

FOREIGN PATENT DOCUMENTS

| | | |
|---|---|---|
| CN | 101883423 A | 11/2010 |
| CN | 101895922 A | 11/2010 |
| WO | WO 2008/008685 A2 | 1/2008 |
| WO | WO 2010/127633 A1 | 11/2010 |

OTHER PUBLICATIONS

European Patent Office Communication enclosing Extended European Search Report for corresponding European Patent Application No. 12825715.1, 7 pages, (Feb. 11, 2015).
Catt, "UE Positioning Based on Cell ID+AoA+TA", 3GPP TSG RAN WG2 Meeting #66, R2-092987, San Francisco, USA, 2 pages, (May 4-8, 2009).
PCT Written Opinion of the International Searching Authority for PCT Counterpart Application No. PCT/CN2012/079327, 22 pages (including English translation), (Nov. 8, 2012).
PCT Notification Concerning Transmittal of International Preliminary Report on Patentability (Chapter I of the Patent Cooperation Treaty) for PCT Counterpart Application No. PCT/CN2012/079327, 24 pages (including English translation), (Mar. 6, 2014).
European Patent Office Communication enclosing Office Action for corresponding European Patent Application No. 12825715.1, 5 pp., (Aug. 29, 2016).
Ericsson, et al., "Impact on Positioning Measurement Requirements with Carrier Aggregation", 3GPP TSG-RAN WG4 Meeting # 57, R4-104504, Jacksonville, USA, 3 pp., (Nov. 15-19, 2010).

* cited by examiner

POSITIONING METHOD, DEVICE AND SYSTEM IN MULTI-CARRIER SYSTEM

CROSS-REFERENCE TO RELATED APPLICATIONS

This present application is a U.S. National Stage under 35 U.S.C. 371 of International Application No. PCT/CN2012/079327, filed on Jul. 30, 2012, entitled POSITIONING METHOD, DEVICE AND SYSTEM IN MULTI-CARRIER SYSTEM, designating the United States and claiming priority from Chinese Patent Application No. 201110240162.9, filed with the Chinese Patent Office on Aug. 19, 2011 and entitled "Positioning method, device and system in multi-carrier system", which was incorporated by reference in its entirety.

FIELD OF THE INVENTION

The present invention relates to communication technologies and particularly to a positioning method, device and system in a multi-carrier system.

BACKGROUND OF THE INVENTION

In an LTE system, the positioning method of TA+AoA is a common positioning method. The positioning precision achieved in this method depends on the accuracy of TA and AoA measurements.

The positioning method of cell_D is a positioning method based upon cell coverage in which the location of a target UE is estimated by using known serving cell geographical information. The serving cell information can be obtained through calling, paging, updating Tracking Area (TA) or other ways. The method of TA+AoA further takes into account factors including a Timing Advance (TA) and an Angle of Arrival (AoA) on the basis of the positioning method of cell_ID to thereby achieve the purpose of more precise positioning.

A base station obtains an AoA of a transmission signal of a UE over an intelligent antenna, where the UE resides on a ray starting with the eNB, and the angle of the ray rotating counterclockwise from the true north is the AoA.

Figure 1:
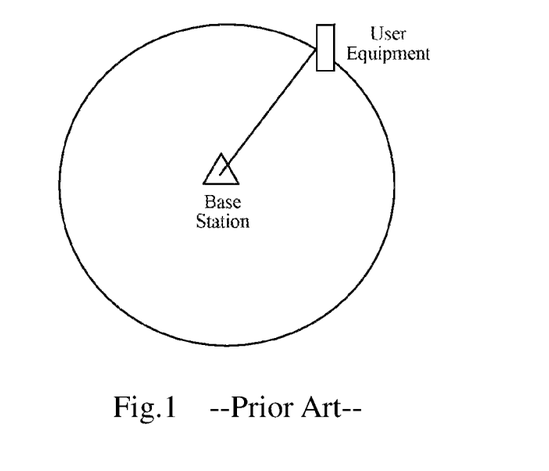
FIG. 1 is a schematic diagram of the principle of TA+AoA positioning in the prior art.

The Timing Advance (TA) can be obtained in two ways, and the TA obtained in the two ways are referred to as TA Type 1 and TA Type 2 respectively, where the TA Type 1 is generally obtained through the calculation of adding the time difference between User Equipment (UE) reception and transmission reported from the UE to a signal reception time difference measured by the base station, and the TA Type 2 is generally obtained by the base station through the measurement in a dedicated random access procedure. The value of the TA multiplied by the velocity of light and then divided by 2 is the distance between the UE and the base station, and the UE resides on a circle with its center being the base station and its radius being the distance between the user equipment and the base station. Location information of the user equipment can be obtained further according to angle information of the AoA, as illustrated in FIG. 1.

The positioning method of TA+AoA is typically used for network-based positioning primarily for the reason that the AoA typically can only be obtained by the base station through measurements, and both the TA Type 1 and the TA Type 2 are also obtained by the base station through calculations or measurements, that is, all the measurement values related to the positioning method are determined by the base station. These measurement values can also be provided by the base station to a positioning server which performs the positioning. In the meantime, some user equipment which does not support the positioning service can also be positioned by this method.

When positioning, an E-SMLC obtains the measurement capability of the user equipment, the positioning server decides all the parameters required to be measured, the base station starts relevant measurements and reports relevant measurement results and location information, and the positioning server performs location calculations.

Figure 2:
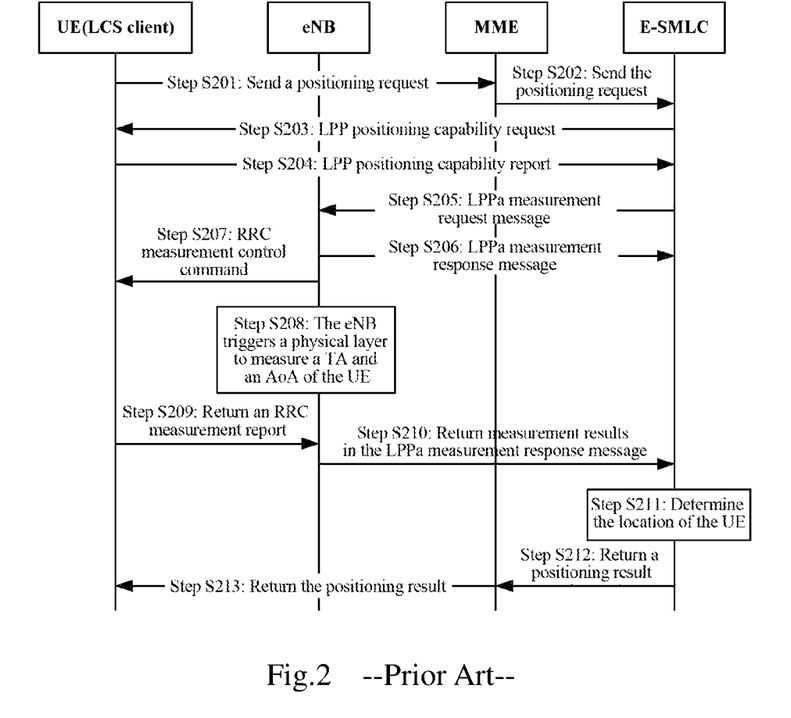
FIG. 2 is a schematic flow chart of TA+AoA positioning based on TA Type 1 in the prior art.

A positioning flow of the positioning method of TA+AoA will be described below in details:

In a first scenario, the positioning is performed by using measurement results of TA Type 1+AoA as illustrated in FIG. 2 particularly as follows:

Step S201: an MME receives a positioning request for a UE, where the positioning request can be a positioning request initiated by the UE in an NAS layer message to obtain its own location information, or a positioning request initiated by a locating service client (LCS client) to the MME to obtain location information of the UE;

Step S202: the MME initiates the positioning request to an E-SMLC;

Step S203: the E-SMLC inquires about the positioning capability of the UE;

Step S204: the E-SMLC receives positioning capability information returned from the UE;

Step S205: the E-SMLC sends a measurement request message to a base station;

Step S206: the E-SMLC receives a response message returned from the base station;

Step S207: the base station sends a measurement control command to the UE;

Step S208: the base station triggers a physical layer to measure a TA and an AoA of the user equipment;

Step S209: the base station receives a measurement report returned from the user equipment;

Step S210: the base station returns measurement results to the E-SMLC;

Step S211: the E-SMLC determines the location of the user equipment according to the measurement results;

Step S212: the E-SMLC returns a positioning result to the MME; and

Step S213: the MME returns the positioning result to the client requesting the positioning.

Figure 3:
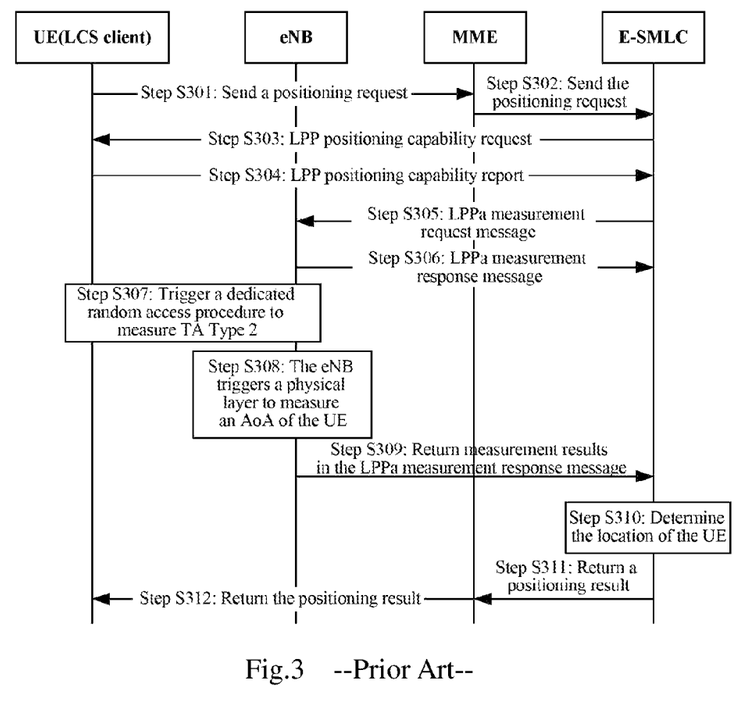
FIG. 3 is a schematic flow chart of TA+AoA positioning based on TA Type 2 in the prior art.

In a second scenario, the positioning is performed by using measurement results of TA Type 2+AoA as illustrated in FIG. 3 particularly as follows:

Step S301: an MME receives a positioning request for a UE, where the positioning request can be a positioning request initiated by the UE in an NAS layer message to obtain its own location information, or a positioning request initiated by a locating service client (LCS client) to the MME to obtain location information of the UE;

Step S302: the MME initiates the positioning request to an E-SMLC;

Step S303: the E-SMLC inquires about the positioning capability of the UE;

Step S304: the E-SMLC receives positioning capability information returned from the UE;

Step S305: the E-SMLC sends a measurement request message to a base station;

Step S306: the E-SMLC receives a response message returned from the base station;

Step S307: the base station triggers a dedicated random access procedure to measure a TA Type 2;

Step S308: the base station triggers a physical layer to measure an AoA of the user equipment;

Step S309: the base station returns measurement results to the E-SMLC;

Step S310: the E-SMLC determines the location of the user equipment according to the measurement results;

Step S311: the E-SMLC returns a positioning result to the MME; and

Step S312: the MME returns the positioning result to the client requesting the positioning.

In the LTE-Advanced (LTE-A) system, peak rates have been increased greatly over those in the LTE system, where downlink 1 Gbps and uplink 500 Mbps are required. Meanwhile the LTE-A system is required to be well compatible with the LTE system. In order to meet the requirements of increased peak rates, compatibility with the LTE system and full use of spectrum resources, the Carrier Aggregation (CA) technology has been introduced to the LTE-A system.

The carrier aggregation technology refers to a mechanism in which multiple cells can be aggregated concurrently for the UE to provide the UE concurrently with data transmission service. In the carrier aggregation system, carriers corresponding to respective cells can be consecutive or inconsecutive in the frequency domain. For compatibility with the LTE system, the maximum bandwidth of each component carrier is 20 MHz, and bandwidths between respective component carriers can be the same or different.

With carrier aggregation, cells in which the user equipment operates include a primary cell (PCell) and several secondary cells (SCells), where the primary cell is responsible for a majority of control and signaling operations, such as transmission of an uplink feedback for downlink data, reporting of CQI, uplink pilot frequency transmission, etc., and the secondary cells are generally used as resources and responsible for data transmission.

In carrier aggregation scenarios, since different carriers may exist in different propagation environments, for example, at different frequencies, or in different propagation environments due to non-co-addressing at the network side, the same user equipment may measure different uplink timing advances over different carriers.

Inventors of the invention have found that the existing TA+AoA method is only applicable to a serving cell as a single-cell positioning method, where the positioning effect depends on measurement effects of the cell. In practice, the accuracy of measuring a TA and an AoA may be affected by factors including environment, signal strength, interference, etc., and there may be different multi-path effects at different frequencies. With the single-cell positioning method, the positioning precision is low.

SUMMARY OF THE INVENTION

Embodiments of the invention provide a positioning method, device and system in a multi-carrier system so as to improve the positioning precision in the multi-carrier system.

A positioning method in a multi-carrier system includes:
sending a positioning measurement request to a base station of a cell where a user equipment to be positioned resides upon reception of a positioning request;
receiving measurement results returned from the base station after performing positioning measurements for the user equipment in at least two cells; and
positioning the user equipment according to the measurement results.

A positioning method in a multi-carrier system includes:
receiving a positioning measurement request used to obtain measurement results of performing positioning measurements for a user equipment;
performing the positioning measurements for the user equipment in at least two cells; and
returning the measurement results obtained by performing the positioning measurements for the user equipment.

A positioning device in a multi-carrier system includes:
a requesting unit configured to send a positioning measurement request to a base station of a cell where a user equipment to be positioned resides upon reception of a positioning request;
a receiving unit configured to receive measurement results returned from the base station after performing positioning measurements for the user equipment in at least two cells; and
a positioning unit configured to position the user equipment according to the measurement results.

A positioning device in a multi-carrier s system includes:
a request receiving unit configured to receive a positioning measurement request used to obtain measurement results of performing positioning measurements for a user equipment;
a positioning measurement unit configured to perform the positioning measurements for the user equipment in at least two cells; and
a measurement result returning unit configured to return the measurement results obtained by performing the positioning measurements for the user equipment.

A positioning system in a multi-carrier system includes:
an E-SMLC configured to send a positioning measurement request to a base station of a cell where a user equipment to be positioned resides upon reception of a positioning request; to receive measurement results returned from the base station alter performing positioning measurements for the user equipment in at least two cells; and to position the user equipment according to the measurement results; and
the base station configured to receive the positioning measurement request used to obtain the measurement results of performing the positioning measurements for the user equipment; to perform the positioning measurements for the user equipment in the at least two cells; and to return the measurement results obtained by performing the positioning measurements for the user equipment.

The embodiments of the invention provide a positioning method, device and system in a multi-carrier system. When performing the positioning in the multi-carrier system, positioning measurements are performed respectively over multiple carriers, and then the user equipment is positioned according to measurement results of the positioning measurements performed respectively over the multiple carriers. Since the number of parameters for reference while the positioning is performed is increased, the positioning precision is improved.

DETAILED DESCRIPTION OF THE EMBODIMENTS

Embodiments of the invention provide a positioning method, device and system in a multi-carrier system. When performing the positioning in the multi-carrier system, positioning measurements are performed respectively over multiple carriers, and then the user equipment is positioned according to measurement results of the positioning measurements performed respectively over the multiple carriers. Since the number of parameters for reference while the positioning is performed is increased, the positioning precision is improved.

Figure 4:
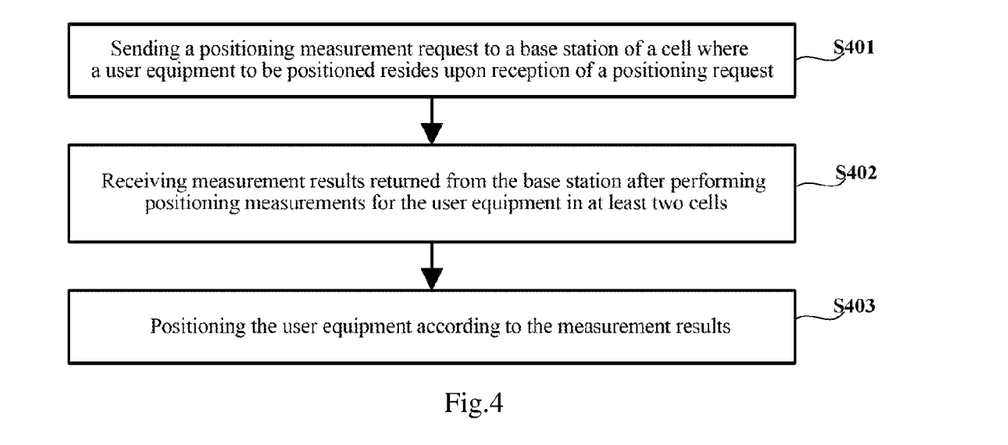
FIG. 4 is a first flow chart of a positioning method in a multi-carrier system according to an embodiment of the invention.

As illustrated in FIG. 4, a positioning method in a multi-carrier system according to an embodiment of the invention includes:

Step S401: sending a positioning measurement request to a base station of a cell where a user equipment to be positioned resides upon reception of a positioning request;

Step S402: receiving measurement results returned from the base station after performing positioning measurements for the user equipment in at least two cells; and Step S403: positioning the user equipment according to the measurement results.

In the step S402, the measurement results include all measurement results obtained by the base station through performing the positioning measurements for the user equipment in the at least two cells; or processing results obtained by the base station through performing preset process on measurement results obtained by performing the positioning measurements for the user equipment in the at least two cells.

For the sake of a convenient description, in the embodiment of the invention, the measurement results can be regarded as including at least two sets of positioning parameters obtained by performing the positioning measurements for the user equipment respectively in the at least two cells, and in the embodiment of the invention, the positioning parameters can be various parameters which can be used for positioning, for example, when the TA+AoA positioning method is used, the positioning parameters can include a TA value and an AoA value; when the TOA positioning method is used, the positioning parameters can include a TOA value; and when other positioning methods are used, the positioning parameters can alternatively include corresponding other parameters. The embodiment of the invention will be described primarily with respect to the TA+AoA positioning scheme.

When the TA+AoA positioning scheme is used, in the step S203, all the measurement results obtained by the base station in the multiple cells particularly include TA values and AoA values obtained by the base station through measurements in the multiple cells.

After measuring positioning parameters corresponding respectively to respective cells, the base station can return all the measured positioning parameters to an E-SMLC sending the positioning measurement request or can firstly perform selection, calculation and other processes on these parameters and then return the processed parameters to the E-SMLC sending the positioning measurement request to thereby lower the amount of transmitted data and improve the positioning efficiency.

When the TA+AoA positioning scheme is used, the TA may be affected by the multi-path effect, so it is preferable to select a less TA value which may be less affected by the multi-path effect. It is preferable to select an average value of the AoA values measured in the respective cells as the AoA value.

Based upon the foregoing process principle, the base station obtains the processing results by performing the preset process on the measurement results measured in the multiple cells particularly as follows:

The base station selects a set of TA value and AoA value with a least TA value among respective sets of TA values and AoA values measured in the multiple cells as the processing results; or The base station selects a least one of respective TA values measured in the multiple cells as a TA value in the processing results and selects an average value of respective AoA values measured in the multiple cells as an AoA value in the processing results; or The base station selects an average value of respective TA values measured in the multiple cells as a TA value in the processing results and selects an average value of respective AoA values measured in the multiple cells as an AoA value in the processing results.

If all the measured positioning parameters are returned directly to the E-SMLC sending the positioning measurement request after respective sets of positioning parameters corresponding respectively to the respective cells are measured, then the E-SMLC needs to process the received positioning parameters upon reception of the respective positioning parameters and then calculates the location of the user equipment according to processing results.

Similarly, the E-SMLC processes the received positioning parameters particularly as follows:

The E-SMLC selects a set of TA value and AoA value with a least TA value among the respective received sets of TA values and AoA values as the processing results; or The E-SMLC selects a least one of the respective TA values as a TA value in the processing results and selects an average value of the respective AoA values as an AoA value in the processing results; or The E-SMLC selects an average value of the respective TA values as a TA value in the processing results and selects an average value of the respective AoA values as an AoA value in the processing results.

Figure 5:
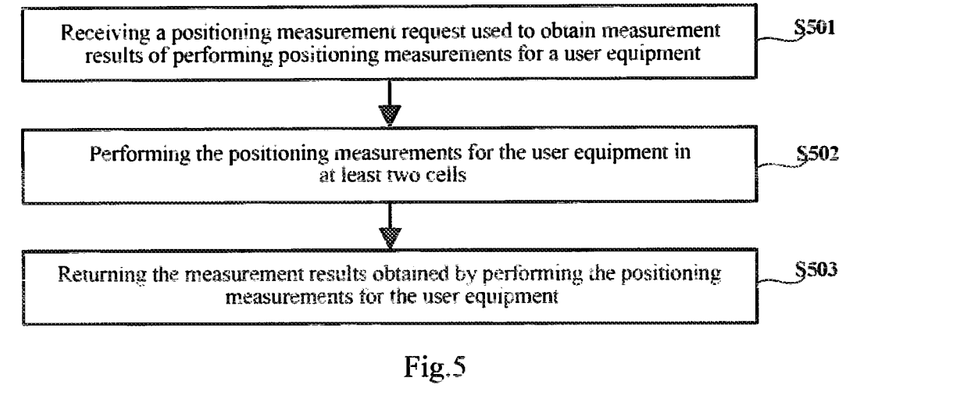
FIG. 5 is a second flow chart of a positioning method in a multi-carrier system according to an embodiment of the invention.

As to the base station side, as illustrated in FIG. 5, a positioning method in a multi-carrier system according to an embodiment of the invention includes:

Step S501: receiving a positioning measurement request used to obtain measurement results of performing positioning measurements for a user equipment;

Step S502: performing the positioning measurements for the user equipment in at least two cells; and Step S503: returning the measurement results obtained by performing the positioning measurements for the user equipment.

When positioning parameters particularly include a TA value and an AoA value, in the step S502, performing the positioning measurements for the user equipment in the at least two cells particularly includes:

measuring TA values of the user equipment in the at least two cells; and measuring AoA values of the user equipment in the at least two cells.

The base station can obtain the TA values of the user equipment in the multiple cells in the following two modes. In a first mode, the TA values are obtained through the calculation of adding the time difference between UE reception and transmission reported from the UE to a signal reception time difference measured by the base station, and a TA Type 1 can be obtained in this mode. The TA Type 1 value is obtained in this mode particularly as follows:

The base station sends a TA measurement control request to the user equipment to request the user equipment to report TA values of the multiple cells, receives time difference values of the multiple cells returned from the user equipment, triggers physical layers of the multiple cells to measure time difference values of uplink signals of the user equipment in the multiple cells, and determines the TA values corresponding to the respective cells from the respective received time difference values and the respective measured time difference values, respectively.

In a second mode, the TA values are obtained by the base station through measurements in a dedicated random access procedure, and when a TA Type 2 value is obtained in this mode, the base station obtains the TA values of the user equipment in the multiple cells particularly as follows: the base station triggers a dedicated random access procedure in the multiple cells to measure TA values, that is, the base station requests the user equipment to send preamble signals in the respective cells and obtains the TA values by measuring time differences at which the preamble signals arrive at the base station.

The base station measures the AoA values of the user equipment in the multiple cells typically by triggering physical layers of the multiple cells to measure the AoA values.

In the step S503, the base station can return directly multiple sets of positioning parameters measured in the multiple cells or can process the positioning parameters measured in the multiple cells and return processing results to thereby lower the amount of returned data, alleviate the system load and also improve the positioning efficiency.

The base station can process the measurement results obtained by performing the positioning measurements in the multiple cells as follows:

The base station selects a set of TA value and AoA value with a least TA value among the respective sets of TA values and AoA values as the processing results; or The base station selects a least one of the respective TA values as a TA value in the processing results and selects an average value of the respective AoA values as an AoA value in the processing results; or The base station selects an average value of the respective TA values as a TA value in the processing results and selects an average value of the respective AoA values as an AoA value in the processing results.

Typically only if antenna geographical locations of the cells selected by the base station for the positioning measurements are the same, the base station can average the measurement results of the respective cells, and if the antenna geographical locations of the cells are different, the base station typically returns the measurement results of the respective cells to the E-SMLC, and the E-SMLC calculates the locations of the user equipment respectively according to the measurement results of the respective cells and determines a final positioning result from the multiple calculated locations of the user equipment.

After the user equipment receives a dedicated preamble assigned by the base station, the user equipment sends the dedicated preamble in a relevant cell, and if the user equipment receives a measurement control request of the network to request the user equipment to report the difference between reception and transmission times of the UE, then the user equipment reports time differences (i.e., UE Rx-Tx time differences) in the multiple cells.

The user equipment can report the UE Rx-Tx time differences of the multiple cells by reporting a time difference per cell in which the UE operates or selecting and reporting one of the multiple TA values.

Figure 6:
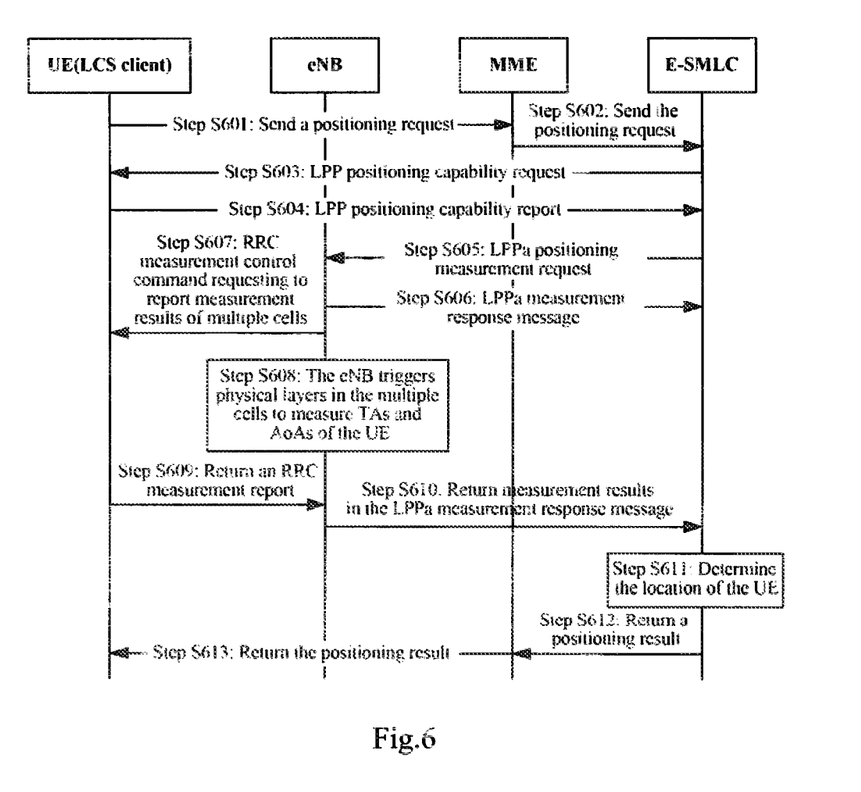
FIG. 6 is a schematic flow chart of TA+AoA positioning based on TA Type 1 according to an embodiment of the invention.

Particularly, as illustrated in FIG. 6, the positioning is performed by using measurement results of TA Type 1+AoA particularly as follows:

Step S601: an MME receives a positioning request for a UE, where the positioning request can be a positioning request initiated by the UE in an NAS layer message to obtain its own location information, or a positioning request initiated by a locating service client (LCS client) to the MME to obtain location information of the UE;

Step S602: the MME initiates the positioning request to an E-SMLC;

Step S603: the E-SMLC inquires about the positioning capability of the UE;

Step S604: the E-SMLC receives positioning capability information returned from the UE;

Step S605: the E-SMLC sends a positioning measurement request to a base station;

Step S606: the E-SMLC receives a response message returned from the base station;

Step S607: the base station sends a measurement control command to the UE to request the user equipment to report time differences in multiple cells;

Step S608: the base station triggers physical layers in the multiple cells to measure the time differences and AoAs of the user equipment in the multiple cells;

Step S609: the base station receives a measurement report returned from the user equipment;

Step S610: the base station returns measurement results to the E-SMLC, where the measurement results can be all the measurement results obtained by performing positioning measurements in the multiple cells or processing results obtained by performing preset process on the obtained measurement results;

Step S611: the E-SMLC determines a location of the user equipment according to the measurement results, where if all the measurement results obtained in the multiple cells are received, then the E-SMLC can firstly process the measurement results and then determine the location using processing results or can determine locations respectively using respective sets of measurement results and then determine a final location of the user equipment;

Step S612: the E-SMLC returns a positioning result to the MME; and

Step S613: the MME returns the positioning result to the client requesting the positioning.

Figure 7:
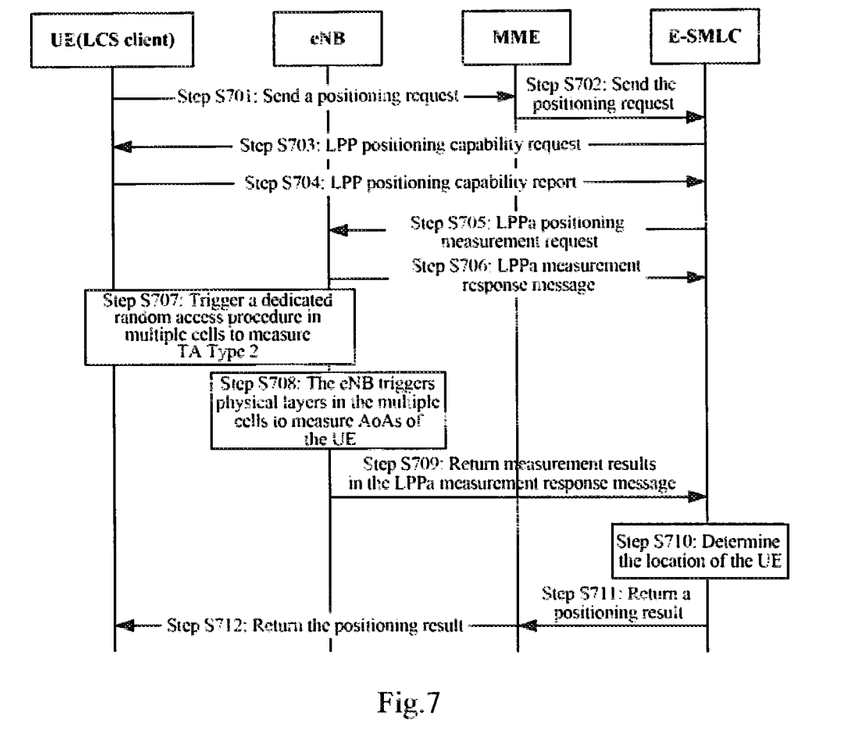
FIG. 7 is a schematic flow chart of TA+AoA positioning based on TA Type 2 according to an embodiment of the invention.

As illustrated in FIG. 7, the positioning is performed by using measurement results of TA Type 2+AoA particularly as follows:

Step S701: an MME receives a positioning request for a UE, where the positioning request can be a positioning request initiated by the UE in an NAS layer message to obtain its own location information, or a positioning request initiated by a locating service client (LCS client) to the MME to obtain location information of the UE;

Step S702: the MME initiates the positioning request to an E-SMLC;

Step S703: the E-SMLC inquires about the positioning capability of the UE;

Step S704: the E-SMLC receives positioning capability information returned from the UE;

Step S705: the E-SMLC sends a positioning measurement request to a base station;

Step S706: the E-SMLC receives a response message returned from the base station;

Step S707: the base station triggers a dedicated random access procedure in multiple cells to perform TA Type 2 measurements;

Step S708: the base station triggers physical layers in the multiple cells to measure AoAs of the user equipment;

Step S709: the base station returns measurement results to the E-SMLC, where the measurement results can be all the positioning parameters measured in the multiple cells or positioning parameters obtained by processing the measured positioning parameters;

Step S710: the E-SMLC determines a location of the user equipment according to the measurement results, where if all the positioning parameters measured in the multiple cells are received, then the E-SMLC can firstly process the respective parameters and then determine the location using the processed positioning parameters or can determine locations respectively using respective sets of positioning parameters and then determine a final location of the user equipment;

Step S711: the E-SMLC returns a positioning result to the MME; and

Step S712: the MME returns the positioning result to the client requesting the positioning.

A particular example will be described below: when the TA Type 1 is used, it is assumed that the user equipment to be positioned operates in two bands which are a band 1 and a band 2, and TAs of the respective bands are maintained separately, and operating cells 1, 2, 3 and 4 of the user equipment are at frequencies F1, F2, F3 and F4, where F1 and F2 belong to the band 1, and F3 and F4 belong to the band 2. When performing the positioning, the base station determines that the user equipment is in an operating status with carrier aggregation, the base station sends RRC signaling to the user equipment to request the user equipment to report UE Rx-Tx time difference results of the multiple cells, and concurrently the base station measures time differences and angles of arrival at which uplink signals of the user equipment in the respective cells arrive at the base station and calculates TA values of the multiple cells respectively in combination with measurement results reported from the user equipment. The base station can select the least TA value as a final measurement result and select an AoA measured in the cell where the least TA is measured as a final AoA, and report these two measurement results to the E-SMLC. The E-SMLC calculates the location of the user equipment according to location information of the cell and the received TA and AoA results. When the user equipment measures Rx-Tx time differences, the user equipment can perform measurements in multiple measurement cells configured by the base station or can determine TA values dependent upon its own condition and report measurement results of the multiple cells after the base station determines the UE Rx-Tx time difference measurement condition.

The measurement request message is generally RRC signaling, and modifications to the RRC signaling are primarily embodied in a measurement report message by adding relevant measurement results in a list reporting the measurement reports of the multiple carriers, where newly added contents in the modified RRC signaling are represented by the bold italic:

```
MeasResultServFreqList-r10 ::=    SEQUENCE (SIZE (1..maxServCell-r10)) OF
MeasResultServFreq-r10
    MeasResultServFreq-r10 ::=        SEQUENCE {
        servFreqId-r10                    ServCellIndex-r10,
        measResultSCell-r10               SEQUENCE {
            rsrpResultSCell-r10               RSRP-Range,
            rsrqResultSCell-r10               RSRQ-Range
        }                                                 OPTIONAL,
        measResultBestNeighCell-r10       SEQUENCE {
            physCellId-r10                    PhysCellId,
            rsrpResultNCell-r10               RSRP-Range,
            rsrqResultNCell-r10               RSRQ-Range
        }                                                 OPTIONAL,
        ...,
        measResultForECID-r11             MeasResultForECID-r9 OPTIONAL
    }
    MeasResultForECID-r9 ::=          SEQUENCE {
        ue-RxTxTimeDiffResult-r9          INTEGER (0..4095),
        currentSFN-r9                     BIT STRING (SIZE (10))
    }
```

When the TA Type 2 is used, it is assumed that the user equipment to be positioned operates in two bands which are a band 1 and a band 2, and TAs of the respective bands are maintained separately, and operating cells 1, 2, 3 and 4 of the user equipment are at frequencies F1, F2, F3 and F4, where F1 and F2 belong to the band 1, and F3 and F4 belong to the band 2. When performing the positioning, the base station determines that the user equipment is in an operating status with carrier aggregation, the base station assigns dedicated preambles in the multiple cells for the user equipment, the user equipment sends corresponding preamble signals in the multiple cells upon reception of the dedicated preambles, and the base station measures time differences at which the preambles arrive and calculates TA values in the respective cells.

It shall be noted that the multiple cells in the embodiments of the invention will not be limited to all the operating cells of the user equipment but can be cells selected by the base station as needed, where there can be a cell per band.

When the measurement results of the multiple cells are reported, message contents between the base station and the E-SMLC can be modified as follows:

E-CID Measurement Result

| IE/Group Name | Presence | Range | IE Type and Reference | Semantics Description |
|---|---|---|---|---|
| Defined parameter contents are omitted | | | | |
| Scell Measured Results | | 0 to maxScell | | |
| >ECGI | M | | | Cell ID |
| >Value Angle of Arrival | M | | INTEGER (0. . . 719) | AoA measurement result |
| >Value Timing Advance Type 1 | O | | INTEGER (0. . . 7690) | TA TYPE1 measurement result |
| >Value Timing Advance Type 2 | O | | INTEGER (0 . . . 7690) | TA TYPE2 measurement result |

Thus the AoA and TA measurement results of the multiple cells can be carried in the E-CID measurement results.

Figure 8:
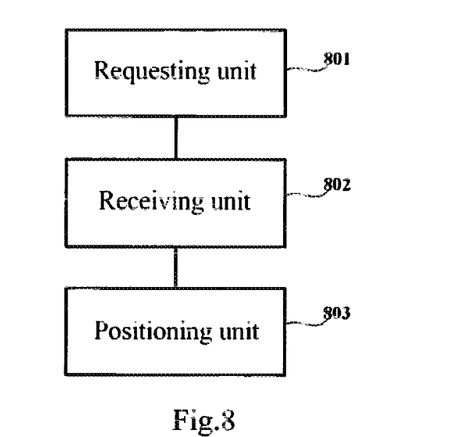
FIG. 8 is a first schematic structural diagram of a positioning device in a multi-carrier system according to an embodiment of the invention.

An embodiment of the invention further correspondingly provides a positioning device in a multi-carrier system, and the device can be particularly an E-SMLC, as illustrated in FIG. 8, which includes:

A requesting unit 801 configured to send a positioning measurement request to a base station of a cell where a user equipment to be positioned resides upon reception of a positioning request;

A receiving unit 802 configured to receive measurement results returned from the base station after performing positioning measurements for the user equipment in at least two cells; and A positioning unit 803 configured to position the user equipment according to the measurement results.

Further, when the measurement results include all the positioning parameters measured by the base station in the multiple cells, the positioning unit 803 is specifically configured:

to perform preset process on the received measurement results to obtain processing results; and to calculate a location of the user equipment according to the processing results.

When the measurement results returned from the base station after performing the positioning measurements for the user equipment in the at least two cells include TA values and AoA values obtained by the base station through the measurements for the user equipment in the at least two cells, the positioning unit 803 is specifically configured:

to select a set of TA value and AoA value with a least TA value among respective received sets of TA values and AoA values as the processing results and to calculate the location of the user equipment according to the processing results; or to select a least one of respective TA values as a TA value in the processing results, to select an average value of respective AoA values as an AoA value in the processing results and to calculate the location of the user equipment according to the processing results; or to select an average value of respective TA values as a TA value in the processing results, to select an average value of respective AoA values as an AoA value in the processing results and to calculate the location of the user equipment according to the processing results.

Figure 9:
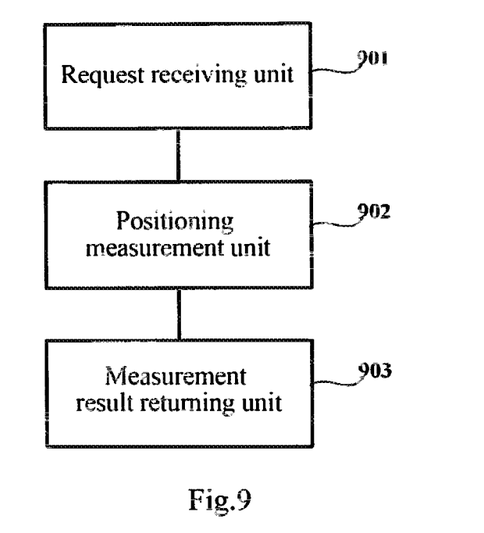
FIG. 9 is a second schematic structural diagram of a positioning device in a multi-carrier system according to an embodiment of the invention.

An embodiment of the invention further correspondingly provide a positioning device in a multi-carrier system, and the device can be particularly a base station, as illustrated in FIG. 9, which includes:

A request receiving unit 901 configured to receive a positioning measurement request used to obtain measurement results of performing positioning measurements for a user equipment;

A positioning measurement unit 902 configured to perform the positioning measurements for the user equipment in at least two cells; and A measurement result returning unit 903 configured to return the measurement results obtained by performing the positioning measurements for the user equipment.

Further, when positioning parameters specifically include a TA value and an AoA value, the positioning measurement unit 902 is specifically configured;

to measure TA values of the user equipment in the at least two cells; and to measure AoA values of the user equipment in the at least two cells.

The measurement result returning unit 903 is specifically configured:

to return directly all the measurement results obtained by performing the positioning measurements for the user equipment in the at least two cells; or to return processing results obtained by performing preset process on the measurement results obtained by performing the positioning measurements for the user equipment in the at least two cells.

When the measurement results need to be processed, the measurement result returning unit 903 is specifically configured:

to select a set of TA value and AoA value with a least TA value among respective sets of TA values and AoA values as the processing results and to return the processing results; or to select a least one of respective TA values as a TA value in the processing results, to select an average value of respective AoA values as an AoA value in the processing results and to return the processing results; or to select an average value of respective TA values as a TA value in the processing results, to select an average value of respective AoA values as an AoA value in the processing results and to return the processing results.

Figure 10:
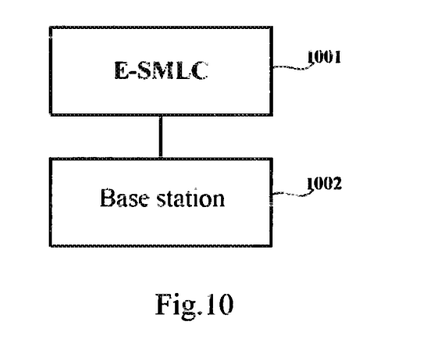
FIG. 10 is a schematic structural diagram of a positioning system in a multi-carrier system according to an embodiment of the invention.

An embodiment of the invention further provides a positioning system in a multi-carrier system, as illustrated in FIG. 10, which includes:

An E-SMLC 1001 configured to send a positioning measurement request to a base station of a cell where a user equipment to be positioned resides upon reception of a positioning request; to receive measurement results returned from the base station after performing positioning measurements for the user equipment in at least two cells; and to position the user equipment according to the measurement results; and The base station 1002 configured to receive the positioning measurement request used to obtain the measurement results of performing the positioning measurements for the user equipment; to perform the positioning measurements for the user equipment in the at least two cells; and to return the measurement results obtained by performing the positioning measurements for the user equipment.

When the measurement results returned from the base station after performing the positioning measurements for the user equipment in the at least two cells include all the measurement results obtained by the base station through performing the positioning measurements for the user equipment in the at least two cells, the E-SMLC 1001 is further configured:

to perform preset process on the received measurement results to obtain processing results.

The embodiments of the invention provide a positioning method, device and system in a multi-carrier system. When performing the positioning in the multi-carrier system, positioning measurements are performed respectively over multiple carriers, and then the user equipment is positioned according to measurement results of the positioning measurements performed respectively over the multiple carriers. Since the number of parameters for reference while the positioning is performed is increased, the positioning precision is improved.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore, the invention can be embodied in the form of a computer program product embodied in one or more computer useable storage mediums (including but not limited to a disk memory, a CD-ROM, an optical memory, etc.) in which computer useable program codes are contained.

The invention has been described with reference to flow charts and/or block diagrams of the method, the device (system) and the computer program product according to the embodiments of the invention. It shall be appreciated that respective flows and/or blocks in the flow charts and/or the block diagrams and combinations of the flows and/or the blocks in the flow charts and/or the block diagrams can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow charts and/or the block(s) of the block diagrams.

These computer program instructions can also be stored into a computer readable memory capable of directing the computer or the other programmable data processing device to operate in a specific manner so that the instructions stored in the computer readable memory create manufactures including instruction means which perform the functions specified in the flow(s) of the flow charts and/or the block(s) of the block diagrams.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow charts and/or the block(s) of the block diagrams.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as these modifications and variations come into the scope of the claims appended to the invention and their equivalents.

What is claimed is:

1. A positioning method in a multi-carrier system, comprising:

aggregating a plurality of cells belonging to a base station for a user equipment;

sending a positioning measurement request to the base station of a cell where the user equipment to be positioned resides upon reception of a positioning request;

receiving measurement results returned from the base station after performing positioning measurements for the user equipment on a primary carrier and at least one secondary carrier, in response to the positioning measurement request, wherein the primary carrier and at least the one secondary carrier are configured to at least two cells of the plurality of aggregated cells for that user equipment; and positioning the user equipment according to the measurement results;

wherein the measurement results returned from the base station after performing the positioning measurements for the user equipment in the at least two cells specifically comprise:

all measurement results obtained by the base station through performing the positioning measurements for the user equipment in the at least two cells; or processing results obtained by the base station through performing preset process on measurement results obtained by performing the positioning measurements for the user equipment in the at least two cells;

wherein all the measurement results obtained by the base station through performing the positioning measurements for the user equipment in the at least two cells specifically comprise:

Timing Advance, TA, values and Angle of Arrival, AoA, values obtained by the base station through the measurements for the user equipment in the at least two cells;

wherein when the measurement results returned from the base station after performing the positioning measurements for the user equipment in the at least two cells include all the measurement results obtained by the base station through performing the positioning measurements for the user equipment in the at least two cells, positioning the user equipment according to the measurement results specifically comprises:

performing the preset process on the received measurement results to obtain processing results; and calculating a location of the user equipment according to the processing results;

wherein performing the preset process on the received measurement results to obtain the processing results specifically comprises one of the following:

selecting a set of TA value and AoA value with a least TA value among respective received sets of TA values and AoA values as the processing results;

selecting a least one of respective TA values as a TA value in the processing results and selecting an average value of respective AoA values as an AoA value in the processing results; and selecting an average value of respective TA values as a TA value in the processing results and selecting an average value of respective AoA values as an AoA value in the processing results.

2. The method according to claim 1, wherein the processing results obtained by the base station through performing the preset process on the measurement results obtained by performing the positioning measurements for the user equipment in the at least two cells are specifically obtained as follows:

selecting a set of TA value and AoA value with a least TA value among respective sets of TA values and AoA values obtained by the base station through the measurements for the user equipment in the at least two cells as the processing results; or selecting a least one of respective TA values obtained by the base station through the measurements for the user equipment in the at least two cells as a TA value in the processing results, and selecting an average value of respective AoA values obtained by the base station through the measurements for the user equipment in the at least two cells as an AoA value in the processing results; or selecting an average value of respective TA values obtained by the base station through the measurements for the user equipment in the at least two cells as a TA value in the processing results, and selecting an average value of respective AoA values obtained by the base station through the measurements for the user equipment in the at least two cells as an AoA value in the processing results.

3. A positioning method in a multi-carrier system, comprising:

aggregating a plurality of cells belonging to a base station for a user equipment;

receiving a positioning measurement request used to obtain measurement results of performing positioning measurements for the user equipment;

performing the positioning measurements for the user equipment on a primary carrier and at least one secondary carrier, in response to the positioning measurement request, wherein the primary carrier and at least the one secondary carrier are configured to at least two cells of the plurality of aggregated cells for that user equipment; and returning the measurement results obtained by performing the positioning measurements for the user equipment;

wherein performing the positioning measurements for the user equipment in the at least two cells specifically comprises:

measuring TA values of the user equipment in the at least two cells; and measuring AoA values of the user equipment in the at least two cells;

wherein returning the measurement results obtained by performing the positioning measurements for the user equipment specifically comprises:

returning directly all the measurement results obtained by performing the positioning measurements for the user equipment in the at least two cells; or returning processing results obtained by performing preset process on the measurement results obtained by performing the positioning measurements for the user equipment in the at least two cells;

wherein performing the preset process on the measurement results obtained by performing the positioning measurements for the user equipment in the at least two cells specifically comprises one of the following:

selecting a set of TA value and AoA value with a least TA value among respective sets of TA values and AoA values as the processing results;

selecting a least one of respective TA values as a TA value in the processing results and selecting an average value of respective AoA values as an AoA value in the processing results; and selecting an average value of respective TA values as a TA value in the processing results and selecting an average value of respective AoA values as an AoA value in the processing results.

4. The method according to claim 3, wherein measuring the TA values of the user equipment in the at least two cells specifically comprises:

sending a TA measurement control request to the user equipment to request the user equipment to measure the TA values of the at least two cells, receiving time difference values of the at least two cells returned from the user equipment, triggering physical layers of corresponding cells to measure time difference values of the user equipment in the corresponding cells, and determining the TA values corresponding to respective cells from the respective received time difference values and the respective measured time difference values, respectively; or triggering a dedicated random access procedure in the at least two cells to measure the TA values.

5. The method according to claim 3, wherein measuring the AoA values of the user equipment in the at least two cells specifically comprises:

triggering physical layers of the at least two cells to measure the AoA values.

6. A positioning system in a multi-carrier system, comprising:

a plurality of cells belonging to a base station are aggregated for a user equipment;

an E-SMLC configured to send a positioning measurement request to the base station of a cell where the user equipment to be positioned resides upon reception of a positioning request; to receive measurement results returned from the base station after performing positioning measurements for the user equipment on a primary carrier and at least one secondary carrier, in response to the positioning measurement request, wherein the primary carrier and at least the one secondary carrier are configured to at least two cells of the plurality of aggregated cells for that user equipment; and to position the user equipment according to the measurement results; and the base station configured to receive the positioning measurement request used to obtain the measurement results of performing the positioning measurements for the user equipment; to perform the positioning measurements for the user equipment on the primary carrier and at least the one secondary carrier, in response to the positioning measurement request; and to return the measurement results obtained by performing the positioning measurements for the user equipment;

wherein the measurement results returned from the base station after performing the positioning measurements for the user equipment in the at least two cells specifically comprise:
all measurement results obtained by the base station through performing the positioning measurements for the user equipment in the at least two cells; or
processing results obtained by the base station through performing preset process on measurement results obtained by performing the positioning measurements for the user equipment in the at least two cells;
wherein all the measurement results obtained by the base station through performing the positioning measurements for the user equipment in the at least two cells specifically comprise:
Timing Advance, TA, values and Angle of Arrival, AoA, values obtained by the base station through the measurements for the user equipment in the at least two cells;
wherein when the measurement results returned from the base station after performing the positioning measurements for the user equipment in the at least two cells include all the measurement results obtained by the base station through performing the positioning measurements for the user equipment in the at least two cells, positioning the user equipment according to the measurement results specifically comprises:
performing the preset process on the received measurement results to obtain processing results; and
calculating a location of the user equipment according to the processing results;
wherein performing the preset process on the received measurement results to obtain the processing results specifically comprises one of the following:
selecting a set of TA value and AoA value with a least TA value among respective received sets of TA values and AoA values as the processing results;
selecting a least one of respective TA values as a TA value in the processing results and selecting an average value of respective AoA values as an AoA value in the processing results; and
selecting an average value of respective TA values as a TA value in the processing results and selecting an average value of respective AoA values as an AoA value in the processing results.

7. The system according to claim 6, wherein when the measurement results returned from the base station after performing the positioning measurements for the user equipment in the at least two cells include all the measurement results obtained by the base station through performing the positioning measurements for the user equipment in the at least two cells, the E-SMLC is further configured:
to perform preset process on the received measurement results to obtain processing results;
wherein performing the positioning measurements for the user equipment in the at least two cells specifically comprises:
measuring TA values of the user equipment in the at least two cells; and
measuring AoA values of the user equipment in the at least two cells;
wherein returning the measurement results obtained by performing the positioning measurements for the user equipment specifically comprises:
returning directly all the measurement results obtained by performing the positioning measurements for the user equipment in the at least two cells; or
returning processing results obtained by performing preset process on the measurement results obtained by performing the positioning measurements for the user equipment in the at least two cells;
wherein performing the preset process on the measurement results obtained by performing the positioning measurements for the user equipment in the at least two cells specifically comprises one of the following:
selecting a set of TA value and AoA value with a least TA value among respective sets of TA values and AoA values as the processing results;
selecting a least one of respective TA values as a TA value in the processing results and selecting an average value of respective AoA values as an AoA value in the processing results; and
selecting an average value of respective TA values as a TA value in the processing results and selecting an average value of respective AoA values as an AoA value in the processing results.

* * * * *